(12) United States Patent
Peterson (10) Patent No.: US 12,460,732 B2
(45) Date of Patent: Nov. 4, 2025

(54) VARIABLE FLOW CHECK VALVE DEVICE, SUSPENSION VALVE, VEHICLE SUSPENSION SYSTEM AND METHOD

(71) Applicant: ETO MAGNETIC GmbH, Stockach (DE)

(72) Inventor: Matthew Peterson, Ada, MI (US)

(73) Assignee: ETO MAGNETIC GmbH, Stockach (DE)

( * ) Notice: Subject to any disclaimer, the term of this patent is extended or adjusted under 35 U.S.C. 154(b) by 112 days.

(21) Appl. No.: 18/176,869

(22) Filed: Mar. 1, 2023

(65) Prior Publication Data
US 2024/0295272 A1 Sep. 5, 2024

(51) Int. Cl.
| | |
|---|---|
| F16F 9/46 | (2006.01) |
| F16K 15/04 | (2006.01) |
| F16K 15/18 | (2006.01) |
| F16K 39/04 | (2006.01) |
| B60G 17/08 | (2006.01) |

(52) U.S. Cl.
CPC ........ F16K 15/1843 (2021.08); F16K 15/042 (2013.01); F16K 39/04 (2013.01); B60G 17/08 (2013.01); *B60G 2204/62* (2013.01); *B60G 2206/41* (2013.01); *B60G 2500/114* (2013.01); *B60G 2600/21* (2013.01); *B60G 2800/162* (2013.01); *F16F 9/465* (2013.01); *F16F 9/466* (2013.01); *F16K 2200/401* (2021.08)

(58) Field of Classification Search
CPC .... F16K 15/1843; F16K 15/042; F16K 39/04; F16K 2200/401; B60G 17/08; B60G 2204/62; B60G 2206/41; B60G 2500/114; B60G 2600/21; B60G 2800/162; F16F 9/34–3488; F16F 9/44–469; F16F 9/50–526

USPC .............. 251/129.01–129.22; 188/266–322.5
See application file for complete search history.

(56) References Cited

U.S. PATENT DOCUMENTS

| | | | | |
|---|---|---|---|---|
| 2,375,410 A | * | 5/1945 | Gondek | ................ E21D 15/512 251/38 |
| 4,785,920 A | | 11/1988 | Knecht et al. | |

(Continued)

FOREIGN PATENT DOCUMENTS

ES        2396095 B1       1/2014

OTHER PUBLICATIONS

International Search Report of the International Searching Authority dated Jun. 12, 2024 issued in corresponding International Patent Application No. PCT/EP2024/055260.

*Primary Examiner* — Craig J Price
(74) *Attorney, Agent, or Firm* — Posz Law Group, PLC (57) ABSTRACT

A variable flow check valve device includes an inlet connected with a first pressure fluid reservoir, an outlet connected with a second pressure fluid reservoir, which is separate and/or separable from the first pressure fluid reservoir, a check valve closing member that opens and closes the outlet in response to a pressure difference of the pressure fluid on opposite sides of the check valve closing member, and a spool valve with a movable spool in a flow path of the pressure fluid extending from the inlet to the outlet. The spool valve forms a variable orifice within the flow path of the pressure fluid. The variable flow check valve device includes a force balancing unit in the flow path which creates a balancing force to at least partially counteract a force acting on the spool when the pressure fluid passes the spool valve.

20 Claims, 7 Drawing Sheets

(56) References Cited

U.S. PATENT DOCUMENTS

| | | | | |
|---|---|---|---|---|
| 5,303,804 A | * | 4/1994 | Spiess | F16F 9/465 |
| | | | | 188/266.8 |
| 5,850,896 A | * | 12/1998 | Tanaka | F16F 9/465 |
| | | | | 188/266.2 |
| 6,745,992 B2 | * | 6/2004 | Yang | G05D 16/2097 |
| | | | | 91/461 |
| 6,869,060 B2 | * | 3/2005 | Barber | F15B 13/0433 |
| | | | | 251/30.02 |
| 9,777,867 B2 | * | 10/2017 | Ewers | F16K 31/1221 |

* cited by examiner

VARIABLE FLOW CHECK VALVE DEVICE, SUSPENSION VALVE, VEHICLE SUSPENSION SYSTEM AND METHOD

STATE OF THE ART

The invention relates to a variable flow check valve device, a monodirectional or a bidirectional suspension valve, an adjustable vehicle suspension system and a method for operating the variable flow check valve.

Suspension valves with variable flow check valve devices comprising spools are already known from the state of the art. Often the variable flow check valves require a relatively high operating force due to counteracting pressure forces or even jet forces arising when the spool is opened.

The objective of the invention is in particular to provide a device with advantageous properties regarding an operation of the device, in particular concerning the required operating forces. The objective is achieved, according to the invention, by the features of the independent claims while advantageous implementations and further developments of the invention may be gathered from the subordinate claims.

Advantages of the Invention

The invention pertains to a variable flow check valve device comprising an inlet connected with a first pressure fluid reservoir, an outlet connected with a second pressure fluid reservoir, which is separate and/or separable from the first pressure fluid reservoir, a check valve closing member configured to open and to close the outlet in response to a pressure difference of the pressure fluid on opposite sides of the check valve closing member, and a spool valve with a movable spool disposed in a flow path of the pressure fluid extending from the inlet to the outlet, the spool valve forming a variable orifice within the flow path of the pressure fluid.

It is proposed that the variable flow check valve device further comprises a force balancing unit, in particular a jet force balancing unit, disposed in the flow path of the pressure fluid and configured to create a balancing force to at least partially counteract a pressure force, in particular a jet force, acting on the spool when the pressure fluid passes the at least partially opened spool valve, in particular on its way from the inlet to the outlet. By this design, advantageous characteristics regarding operating forces of the variable flow check valve device can be achieved. In particular, the operating forces necessary to operate the variable flow check valve device, in particular to open the spool, can advantageously be lowered significantly. Thus, an energy-efficient operation of the variable flow check valve device can advantageously be achieved. In particular the variable flow check valve device represents a check valve device, the flow of which is variably adjustable. The variable flow check valve device can in particular only comprise a single monodirectional flow path or comprise two flow paths, each of which allowing a flow through the variable flow check valve device in a different direction. Thus, the variable flow check valve device could be monodirectional or bidirectional. The flow path or the flow paths each preferably comprise a destined inlet and a destined outlet which are connected to different fluid reservoirs. The first pressure fluid reservoir and the second pressure fluid reservoir are in particular pressure fluid reservoirs of a damping system or of a suspension, for example of a vehicle. The first pressure fluid reservoir and the second pressure fluid reservoir are free of any hydraulic connections besides the variable flow check valve. In particular the first pressure fluid reservoir could belong to a compression stage of a shock absorber while the second pressure fluid reservoir could belong to a rebound stage of the shock absorber, or vice versa.

The check valve closing member(s) could be implemented as a check ball, as a check poppet or as a check flap or similar. In particular, the check valve closing member is arranged in a proximity of the outlet that is connected with the second pressure fluid reservoir. In particular in this case, the term "in proximity" should be understood as at least partly within the last 30%, preferably within the last 20% and advantageously within the last 10% of a full minimal extension of the flow path between the inlet and the outlet. The check valve closing member/s is/are implemented in a way that it/they is/are moved onto a valve seat when a pressure from one side acts on it/them while it/they is/are removed from the valve seat when a pressure from an opposing side acts on it/them. When the check valve closing member/s is/are located on the valve seat, the corresponding flow path is hydraulically closed. The spool valve preferably comprises of the movable spool, being implemented as a movable cylinder and a cylindrical housing, in which the spool is tightly fit and which is configured to guide the spool's movement. In particular the term, "configured" shall be understood to mean specially programmed, designed and/or equipped. By "configured" it is to be understood in particular that an object is intended for a certain function, that the object fulfills and/or executes this certain function in at least one application and/or operating state. A size of the variable orifice implemented by the spool valve in particular depends on a position of the spool within the cylindrical housing.

When the spool of the spool valve is moved into an opened position, the flow of the fluid pressure that is passing the opening creates a pressure force, in particular a jet force, which (continuously) acts on the spool in a direction opposite to an opening direction of the spool valve. Thus, a force has to be exerted on the spool in order to just keep the spool from self-closing and/or to keep the opening of the spool open. The force balancing unit is in particular configured to at least partially counteract the pressure force, in particular the jet force, in an automatic manner and/or without the need for an application of an external force or power source. In particular, the pressure force and/or the jet force and the balancing force act in at least substantially opposite directions. In particular, the pressure force and/or jet force acts at least predominantly against an opening direction of the spool of the spool valve. In particular, the balancing force acts at least predominantly in the opening direction of the spool of the spool valve. Preferably, the balancing force is created indirectly by the force balancing unit, for example by manipulating a pressure that acts on at least one side of the spool of the spool valve. In particular, the pressure force and/or the jet force is proportional to the flow of the pressure fluid through the spool valve. Advantageously, the balancing force is proportional to the flow of the pressure fluid through the spool valve. Advantageously, the balancing force is proportional to the pressure force and/or the jet force caused by the flow of the pressure fluid through the spool valve. In particular, the force balancing unit is configured to generate at least a pressure difference across the spool (from the pressure area of the spool at the spool opening to the free end of the spool) of more than 0.4 bar, preferably of more than 0.5 bar. In particular, the spool valve of the variable flow check valve device in its open state is always flowed through in the same direction regardless of whether the higher pressure is applied to the first pressure fluid reservoir or the second pressure fluid reservoir.

In addition, it is proposed that the force balancing unit is implemented as a jet force balancing unit. In this way an energy-efficient operation of the variable flow check valve device can advantageously be achieved, in particular also at higher flows or higher pressures within the variable flow check valve. The jet force balancing unit is in particular configured to at least partially counteract the pressure force and the jet force, in case it arises, in an automatic manner and/or without the need for an application of an external force or power source.

Furthermore, it is proposed that the force balancing unit, in particular the jet force balancing unit, comprises a balancing tube element that is implemented as a Pitot tube or as a Venturi tube. Thus, a simple, effective and/or efficient generation of the balancing force can be achieved. Advantageously, the balancing force is generated by basic physical/hydraulic principles without the need for an external power source. In particular, the balancing tube element is configured to collect a dynamic pressure of the pressure fluid flow along the flow path from the inlet to the outlet. Preferably, the balancing tube element is implemented as a round tube and/or has a straight course. Alternatively other cross sections, like a square cross section or a polygonal cross section are conceivable. Alternatively other courses, like a slightly curved or kinked course are conceivable. In particular, in case the balancing tube element is implemented as a Pitot tube, its opening (in contrast to most common Pitot tubes) is not directed towards the mean flow direction but at least partly away from it. In particular, in case the balancing tube element is implemented as a Venturi tube, its opening (in contrast to most common Venturi tubes) is not located directly at a wall of the flow path but at the tip of a protruding part of the Venturi tube, which is located within the flow path at a location where the flow velocity is different from zero when the spool is opened. In particular, the balancing tube element applies the so-called Bernoulli effect. In particular in a bidirectional implementation of the variable flow check valve device, the balancing tube element is arranged at a section of the flow paths of the bidirectional variable flow check valve device, which is flown through in an identical direction independently on which flow path of the bidirectional variable flow check valve device is currently opened. In particular in the bidirectional implementation of the variable flow check valve device, the balancing tube element is arranged at a section of the flow paths of the bidirectional variable flow check valve device, which is commonly used by all possible flow paths of the bidirectional variable flow check valve device.

When the balancing tube element is at least partially protruding into the flow path from a wall delimiting the flow path, an advantageously large balancing force can be generated, in particular due to the fact that in a typical (approximately laminar) flow the highest flow velocity within a tube is located at the center of the tube while the lowest flow velocity within the tube is located at the walls of the tube. The Bernoulli effect is larger the higher the respective flow velocity. In particular, the balancing tube element is protruding to at least 20%, preferably to at least 30% and advantageously to at least 40% of an overall cross section of the flow within the flow path at the location of the balancing tube element.

When in addition, the balancing tube element is tilted in/towards the direction of a mean flow direction of the pressure fluid within the flow path at a location of the balancing tube element, an advantageously large balancing force can be generated. In particular, the (straight) balancing tube element is tilted by at least 5°, preferably by at least 7°, more preferably by at least 10° and most preferably by less than 20° relative to a perpendicular to the mean flow direction within the flow path at the location of the balancing tube element. In particular, the (straight) balancing tube element is tilted by less than least 40°, preferably by less than 30°, more preferably by less than 20° and most preferably by less than 15° relative to the perpendicular to the mean flow direction within the flow path at the location of the balancing tube element. In particular, the (straight) balancing tube element is tilted by at least 45°, preferably by at least 55°, more preferably by at least 65° and most preferably by at least 75° relative to the mean flow direction within the flow path at the location of the balancing tube element. In particular, the (straight) balancing tube element is tilted by less than 85°, preferably by less than 70° and more preferably by less than 75° relative to the mean flow direction within the flow path at the location of the balancing tube element.

When additionally, the balancing tube element, in particular at an end which is arranged within the flow path, comprises an opening that is at least partially facing away from a mean flow of the pressure fluid in the flow path, an advantageously large balancing force can be generated. In particular, an opening area of the opening of the balancing tube element which is located within the flow path is arranged obliquely with regard to the mean flow direction within the flow path at the location of the opening and/or with regard to a wall surface of a wall of the flow path in the proximity of the opening Moreover, it is proposed that the force balancing unit, in particular the jet force balancing unit, comprises a third pressure fluid reservoir that is separate and/or separable from the first pressure fluid reservoir and from the second pressure fluid reservoir, wherein the balancing element, in particular the balancing tube element, is connecting the flow path of the pressure fluid with the third pressure fluid reservoir. Thereby, a pressure reduction in the third pressure fluid reservoir can advantageously be achieved. Consequently, any object that is reaching into the third pressure fluid reservoir, like for example a free end of the spool advantageously experiences a reduced force from the third pressure fluid reservoir. Advantageously, an effective balancing force can be generated this way. Preferably the balancing tube element is arranged behind the variable orifice and in a proximity of the variable orifice. In particular in this case, the term "in proximity" should be understood as at least partly within the surrounding 30%, preferably within the surrounding 20% and advantageously within the surrounding 10% of a full minimal extension of the flow path between the inlet and the outlet. Preferably the balancing element, in particular the balancing tube element, is arranged within an area of the flow path, wherein a flow velocity is at least substantially proportional to an opening size of a spool opening. Alternatively, it is conceivable that the balancing element, in particular the balancing tube element, is arranged at a different location within the flow path, for example even in front of the spool if seen in the flow direction and in case of the monodirectional variable flow check valve device. The balancing element, in particular the balancing tube element, could also be integrated into the spool. The third pressure fluid reservoir in particular is, except for the balancing element, in particular the balancing tube element, free from any hydraulic connection with the first pressure fluid reservoir and the second pressure fluid reservoir, in particular free from any hydraulic connection with the rebound stage and the compression stage of the shock absorber.

Furthermore, it is proposed that the balancing element is implemented as a connecting hole within a wall, in particular of a valve body of the variable flow check valve, that separates the third pressure fluid reservoir from the flow path of the pressure fluid or as a connecting hole within the spool or as the balancing tube element. Thus, a simple, effective and/or efficient generation of the balancing force can be achieved. Advantageously, the balancing force is generated by basic physical/hydraulic principles without the need for an external power source. In particular for low pressure or low flow situations, the connecting hole alternative may represent a particularly cost effective but still reliable and workable solution. In particular in the alternative wherein the connecting hole is implemented in the spool itself, the spool may be made of a single-piece or monolithic body.

In addition, it is proposed that the free end of the spool of the spool valve is arranged within the third pressure fluid reservoir. Thus, an effective balancing force can be generated, in particular by reducing the pressure on the side of the free end of the spool. In particular, the free end of the spool is arranged movably within the third pressure fluid reservoir. In particular, the free end of the spool is arranged opposite to an end of the spool, which connects the spool to a force generation unit, for example an electromagnet. In particular, the spool is implemented as a sliding spool. In particular, the spool sits leak proof in the opening through which it is inserted into the third pressure fluid reservoir. In particular, the balancing tube element is configured to pull a reduced pressure fluid pressure to a back side at the free end of the spool, thus advantageously creating a balancing force that is proportional to the flow (and subsequently the pressure force or the jet force). In particular the pressure in the third pressure fluid reservoir is by at least 0,4 bar, preferably by at least 0.5 bar lower than the pressure in front of the spool opening. This is in particular the case where the flow is around 36 lpm at a 10 bar pressure drop between the first pressure fluid reservoir and the second pressure fluid reservoir. In this case, the pressure forces, in particular the jet forces, can be on the order of about 7 N to 8 N.

When the variable flow check valve device comprises an electromagnet, which is configured to actuate the spool of the spool valve in order to adjust a size of a flow cross section of the variable orifice, in particular at the spool opening, a precise control over the variable flow of the variable flow check valve device can be achieved. In an application within a shock absorber, a damping hardness thus can advantageously be precisely adjusted. Preferably, the electromagnet generates a linear actuation of the spool. In particular, the electromagnet implements a direct acting solenoid, intended to move the spool. The spool could for example have a stroke of about 1.5 mm or more, of which 0.25 mm could be used for the overlap in the closed state and of which 1.25 mm could be used to implement the variable orifice. In particular in this case the spool could have a longitudinal extension of 4.5 mm It is further proposed that the variable flow check valve device comprises a reset spring, which is supported at the free end of the spool of the spool valve. Thus, advantageously an automatic closing of the spool in an energy-less state of the electromagnet can be achieved. Furthermore, the spool is advantageously held in place during normal operation. In particular the spool comprises at its free end an edge, which serves as a spring seat. Alternatively, a separate spring seat disc element could be attached to the free end of the spool. In particular the reset spring has a spring constant of about 10 N/mm. Harder or softer springs are nevertheless conceivable. Preferably the reset spring is implanted as spiral compression spring. However, other types of reset springs like disc springs etc. are conceivable. In particular the reset spring has a length to cross section ratio of about 3:2. In particular, the reset spring can have a conical shape that is smaller at a side facing the free end of the spool. In particular the reset spring has a maximum cross section of more than 30 mm, preferably more than a maximum cross section of the spool.

When the reset spring is at least to a great extent arranged inside the third pressure fluid reservoir, an advantageously compact construction can be achieved. In this case, the term "to a great extent" should in particular be understood as by at least 70%, preferably by at least 80% and more preferably by at least 90%. It is also conceivable that the reset spring is completely arranged within the third pressure fluid reservoir.

In addition, it is proposed that the variable flow check valve device comprises a further inlet, which is connected with the second pressure fluid reservoir. Thus, advantageously a bidirectional operation mode of the variable flow check valve device and/or a basis leakage, setting a basis damping hardness can be achieved.

In particular, the second inlet is arranged at an opposite end of a valve body element of the variable flow check valve device as the inlet. The valve body element preferably comprises channels forming the fluid paths of the variable flow check valve device.

When the further inlet is implemented as a bleed orifice, advantageously a setting of a basis damping hardness can be easily achieved. Preferably in this case, the variable flow check valve device embodies a monodirectional variable flow check valve device.

If instead the further inlet has an at least substantially identical opening cross section as the inlet, a bidirectional variable flow check valve device can advantageously be achieved.

Furthermore, it is proposed that the variable flow check valve device comprises a switching member, which is configured to either open a pressure fluid flow path from the inlet to the variable orifice, in particular to the spool and/or the spool opening, or from the further inlet to the variable orifice, in particular to the spool and/or the spool opening, in response to a pressure difference of the pressure fluid in the first pressure fluid reservoir and the second pressure fluid reservoir. Thus, an easy and simple construction of a bidirectional variable flow check valve device can advantageously be achieved. In particular the switching member can be implemented as a check ball which is interacting with two opposite valve seats, depending on the pressures acting on opposite sides of the switching member.

It is in addition proposed that the variable flow check valve device comprises a further outlet, which is connected with the first pressure fluid reservoir and which comprises a further check valve closing member, configured to open and to close the further outlet in response to a pressure difference of the pressure fluid on opposite sides of the further check valve closing member. Thus, an easy and simple construction of a bidirectional variable flow check valve device can advantageously be achieved. The bidirectional variable flow check valve device comprises a further flow path, which extends from the further inlet to the further outlet. Depending on the pressure difference in the first pressure fluid reservoir and the second pressure fluid reservoir, preferably depending on an activation of a rebound stage of the shock absorber or a compression stage of the shock absorber, either the flow path or the further flow path is opened while the other is closed in turn. In particular, the further check valve closing member is arranged in a proximity of the outlet that is connected with the first pressure fluid reservoir. In particular in this case, the term "in proximity" should be understood as at least partly within the last 30%, preferably within the last 20% and advantageously within the last 10% of a full minimal extension of the flow path between the inlet and the outlet.

Additionally it is proposed that the variable flow check valve device comprises one or more bleed orifices, which are integrated in the spool, and/or in a switching member, which is configured to either open a pressure fluid flow path from the inlet to the variable orifice, in particular the spool and/or the spool opening, or from a further inlet, which is connected with the second pressure fluid reservoir, to the variable orifice, in particular the spool and/or the spool opening, in response to a pressure difference of the pressure fluid in the first pressure fluid reservoir and the second pressure fluid reservoir, and/or in a further check valve closing member located at a further outlet which is connected with the first pressure fluid reservoir and configured to open and to close the further outlet in response to a pressure difference of the pressure fluid on opposite sides of the further check valve closing member. Thus, advantageously a setting of a basis damping hardness can be easily achieved. Furthermore, a compact and simple construction can be achieved. In particular in the bidirectional variable flow check valve device the bleed orifice is integrated in one or all of: the spool, the closing member of the check valve and the switching member of the inlet valve. The bleed orifice(s) can be implemented as a notch or a recess within one or several of those elements.

When the variable flow check valve device comprises a single-piece or monolithic valve body which at least comprises the inlet, the outlet, a first receiving chamber for the check valve closing member, a second receiving chamber for the spool, a third chamber forming a balancing element of the force balancing unit or receiving a balancing tube element to balance a jet force acting on the spool and channels forming the flow path, a simple and/or compact construction of the variable flow check valve device can advantageously be achieved. In particular the valve body is arranged fixedly and/und unmovably within an outer housing of the variable flow check valve device. The outer housing in turn is configured to be inserted into a damper tube of a shock absorber. Moreover, also the third fluid pressure reservoir is implemented by the valve body. An opening of the third pressure fluid reservoir is closed by an adjustable cap element. By adjusting the position of the cap element, a volume of the third pressure fluid reservoir and/or a preload of the reset spring can be set and/or adjusted. The cap element is implemented as a screw, in particular a calibration screw. The term "single-piece" in particular is to be understood as materially joined, for example by a welding process and/or bonding process, etc., and particularly advantageously integrally formed, as by manufacture from a casting and/or by manufacture in a single-component or multi-component injection molding process.

It is furthermore proposed that the balancing tube element is implemented at least partly from a smart material, for example a magnetic shape memory alloy, which is configured to control and/or adjust a pressure force compensation level of the force balancing unit, in particular a jet force compensation level of the jet force balancing unit. Thus, an advantageously precise adjusting, setting and/or calibration of the force balancing unit, in particular the balancing force, can be achieved. The balancing tube element that is made of at least partly smart material could be configured to alter its length and/or its flow cross section, depending on an external signal, for example an applied external magnetic field. By the modification of the length of the balancing tube element, the position of the opening of the balancing tube element within the flow of the pressure fluid in the flow path could be achieved. Since the flow inside a tube usually has a flow profile that is varying over the flow cross section (smaller at the walls and larger in the middle), the resulting balancing force could be changed by changing the position of the opening of the balancing tube element in the flow path. By the modification of the flow cross section of the balancing tube element, the magnitude of a friction within the balancing tube element can be changed. Thus, the resulting balancing force could be changed by adjusting the balancing force via a widening or narrowing the balancing tube element. Magnetic shape memory alloys are in particular ferromagnetic materials that produce force and/or motion under moderate magnetic fields. Typical magnetic shape memory alloys are made from single crystal alloys of nickel, manganese and gallium. Magnetic shape memory alloys of this kind are capable of producing up to 6% strain under external loads.

Furthermore, a monodirectional or bidirectional suspension valve with the variable flow check valve device and an adjustable vehicle suspension system with the monodirectional or bidirectional suspension valve are proposed. By this design, advantageous characteristics regarding operating forces of the suspension valve and/or the vehicle suspension system can be achieved.

In addition, a method for operating the variable flow check valve device, wherein in a method step a force, in particular a jet force, that arises when the pressure fluid passes the at least partially opened spool valve and that acts on the spool is counteracted at least partially by a balancing force created by a pressure force balancing unit, in particular a jet force balancing unit, disposed in the flow path of the pressure fluid, is proposed. By this method, advantageous characteristics regarding operating forces of the variable flow check valve device can be achieved. In particular, the operating forces necessary to operate the variable flow check valve device, in particular to open the spool, can advantageously be lowered significantly. The fluid dynamics behind the arising pressure forces within the described variable flow check valve and/or the jet forces can be assumed to be known to a skilled person in the field of hydraulics.

The variable flow check valve device according to the invention, the monodirectional or a bidirectional suspension valve according to the invention, the adjustable vehicle suspension system according to the invention and the method according to the invention are herein not to be restricted to the applications and implementation forms described above or pictured below. In particular, to fulfill a functionality herein described, the variable flow check valve device according to the invention, the monodirectional or a bidirectional suspension valve according to the invention, the adjustable vehicle suspension system according to the invention and the method according to the invention may comprise a number of respective elements and/or structural components and/or units and/or method steps that differ/s from a number herein mentioned.

DRAWINGS

Further advantages will become apparent from the following description of the drawings. In the drawings, two exemplary embodiments of the invention are depicted. The drawings, the description and the claims contain a plurality of features in combination. Someone skilled in the art will purposefully also consider the features separately and will find further expedient combinations.

It is shown in.

DESCRIPTION OF THE EXEMPLARY EMBODIMENTS

Figure 1:
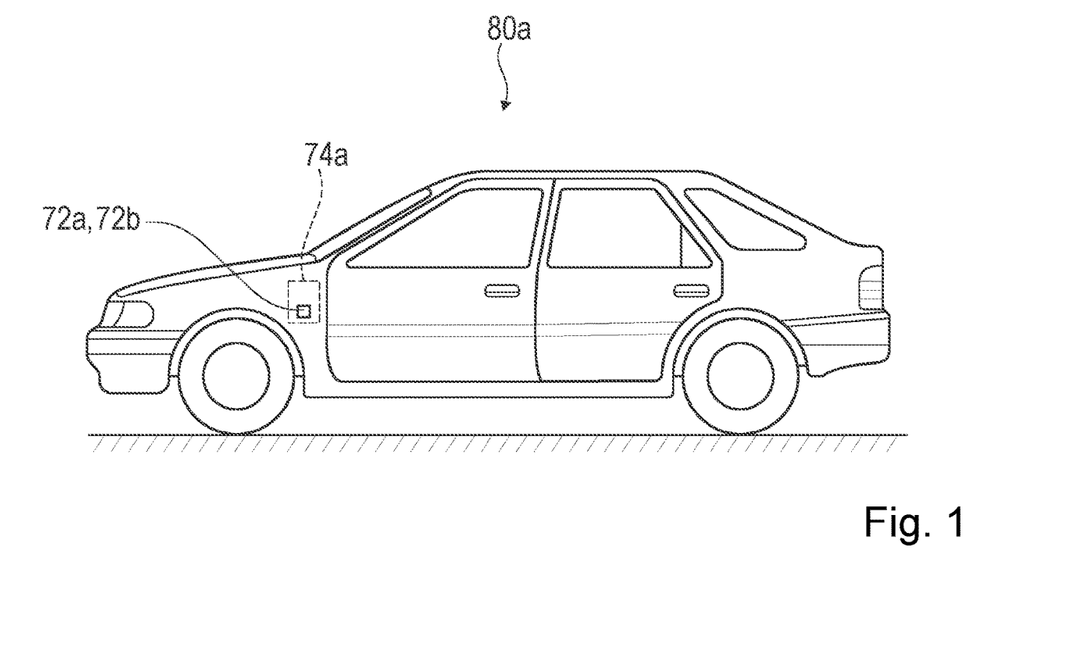
FIG. 1 a schematic representation of a vehicle with a suspension system comprising a variable flow check valve device, FIG. 2 a schematic cross section of a part of an exemplary bidirectional suspension valve with a bidirectional variable flow check valve device wherein a spool valve is in an open state, FIG. 3 a schematic enlarged part of the cross section of the variable flow check valve device with the spool valve being in a closed state, FIG. 4 a schematic perspective view of an exemplary embodiment of a spool of the spool valve, FIG. 5 a schematic flowchart of a method for operating the variable flow check valve device, FIG. 6 a schematical cross sectional view of an alternative monodirectional type of suspension valve with an alternative variable flow check valve device wherein a spool valve is in a closed state, FIG. 7 a schematical cross sectional view of the alternative variable flow check valve device wherein the spool valve is in an open state, FIG. 8 a part of a schematical cross sectional view of a second alternative suspension valve and FIG. 9 a part of a schematical cross sectional view of a third alternative suspension valve.

FIG. 1 shows a schematic representation of a vehicle 80*a*. The vehicle 80*a* comprises a vehicle suspension system 74*a*. The vehicle suspension system 74*a* is adjustable. The vehicle suspension system 74*a* comprises shock absorber. The damping hardness of the shock absorber is settable via the adjustable vehicle suspension system 74*a*. The vehicle suspension system 74*a* comprises a monodirectional or a bidirectional suspension valve 72*a*, 72*b*.

Figure 2:
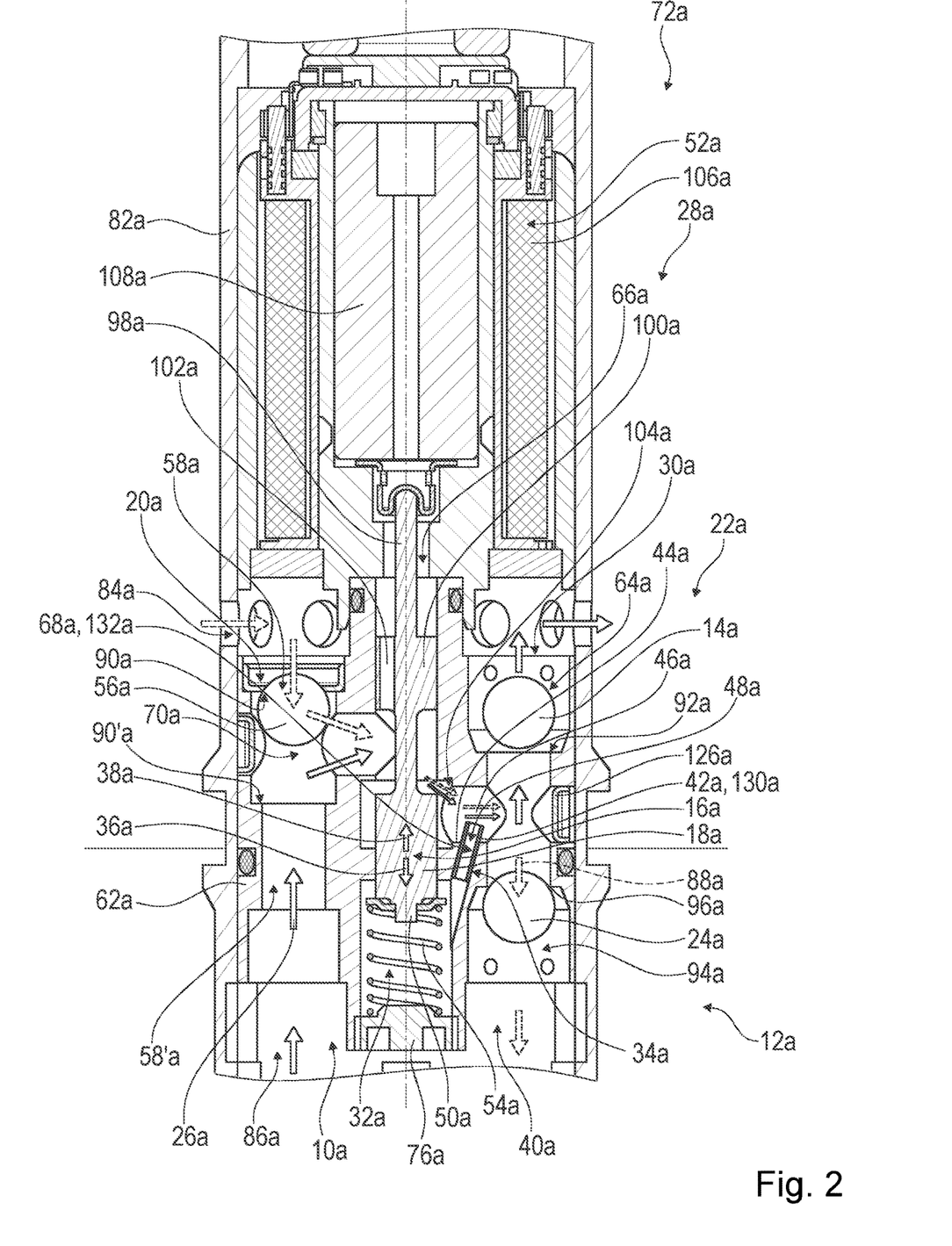

FIG. 2 shows a schematic cross section of a part of an exemplary bidirectional suspension valve 72*a*. The bidirectional suspension valve 72*a* comprises a variable flow check valve device 28*a*. The variable flow check valve device 28*a* comprises a valve body 62*a*. The valve body 62*a* is implemented as a single-piece. The valve body 62*a* could also be implemented completely monolithic. The suspension valve 72*a* comprises a housing 82*a*. The valve body 62*a* is located inside the housing 82*a*. The valve body 62*a* is tightly fit into the housing 82*a*. The suspension valve 72*a* comprises a first pressure fluid reservoir 12*a*. The first pressure fluid reservoir 12*a* is assigned to a compression stage of the shock absorber. The housing 82*a* comprises first openings 84*a*, which provide a hydraulic connection to the first pressure fluid reservoir 12*a*. The suspension valve 72*a* comprises a second pressure fluid reservoir 22*a*. The second pressure fluid reservoir 22*a* is assigned to a rebound stage of the shock absorber. The housing 82*a* comprises at least a second opening 86*a*, which provides a hydraulic connection to the second pressure fluid reservoir 22*a*. The first pressure fluid reservoir 12*a* is separate from the second pressure fluid reservoir 22*a*. The valve body 62*a* comprises a number of sealing elements 126*a*, which are intended to seal machining holes which were introduced into the valve body 62*a* in order to machine channels 70*a* for flow paths 26*a*, 88*a*.

The variable flow check valve device 28*a* comprises an inlet 10*a*. The inlet 10*a* is integrally formed by the valve body 62*a*. The inlet 10*a* is hydraulically connected with the first pressure fluid reservoir 12*a*. The variable flow check valve device 28*a* comprises a further inlet 20*a*. The further inlet 20*a* is integrally formed by the valve body 62*a*. The further inlet 20*a* has an at least substantially identical opening cross section as the inlet 10*a*. The further inlet 20*a* is hydraulically connected with the second pressure fluid reservoir 22*a*. The variable flow check valve device 28*a* comprises an outlet 30*a*. The outlet 30*a* is integrally formed by the valve body 62*a*. A further outlet 40*a* has an at least substantially identical opening cross section as the outlet 30*a*. The outlet 30*a* is connected with the second pressure fluid reservoir 22*a*. The variable flow check valve device 28*a* forms the flow path 26*a* for the pressure fluid. The flow path 26*a* extends from the inlet 10*a* to the outlet 30*a*. The flow path 26*a* is formed by the channels 70*a* which are integrated into the valve body 62*a*. The variable flow check valve device 28*a* comprises the further outlet 40*a*. The further outlet 40*a* is integrally formed by the valve body 62*a*. The further outlet 40*a* is connected with the first pressure fluid reservoir 12*a*. The variable flow check valve device 28*a* forms a further flow path 88*a* for the pressure fluid. The further flow path 88*a* extends from the further inlet 20*a* to the further outlet 40*a*. The further flow path 88*a* is formed by the channels 70*a* which are integrated into the valve body 62*a*. The flow path 26*a* and the further flow path 88*a* overlap with each other partly.

The variable flow check valve device 28*a* comprises a check valve closing member 14*a*. The check valve closing member 14*a* belongs to the outlet 30*a*. The check valve closing member 14*a* is implemented as a check ball. The valve body 62*a* comprises a first receiving chamber 64*a* for the check valve closing member 14*a*. The check valve closing member 14*a* is unlosably arranged within the first receiving chamber 64*a*. The check valve closing member 14*a* is freely movable within the first receiving chamber 64*a*. The first receiving chamber 64*a* forms a valve seat 92*a* for the check valve closing member 14*a*. When the pressure in the first pressure fluid reservoir 12*a* is higher than the pressure in the second pressure fluid reservoir 22*a*, the check valve closing member 14*a* lifts off from the valve seat 92*a* of the first receiving chamber 64*a* and opens the outlet 30*a*. When the pressure in the first pressure fluid reservoir 12*a* is lower than the pressure in the second pressure fluid reservoir 22*a*, the check valve closing member 14*a* closes the valve seat 92*a* of the first receiving chamber 64*a*. The check valve closing member 14*a* is configured to open and to close the outlet 30*a* in response to a pressure difference on opposite sides of the check valve closing member 14*a*. The variable flow check valve device 28*a* comprises a further check valve closing member 24*a*. The further check valve closing member 24*a* belongs to the further outlet 40*a*. The further check valve closing member 24*a* is implemented as a check ball. The valve body 62*a* comprises a fourth receiving chamber 94*a* for the further check valve closing member 24*a*. The further check valve closing member 24*a* is unlosably arranged within the fourth receiving chamber 94*a*. The further check valve closing member 24*a* is freely movable within the fourth receiving chamber 94*a*. The fourth receiving chamber 94*a* forms a valve seat 96*a* for the further check valve closing member 24*a*. When the pressure in the first pressure fluid reservoir 12*a* is higher than the pressure in the second pressure fluid reservoir 22*a*, the further check valve closing member 24a closes the valve seat 96a of the fourth receiving chamber 94a. When the pressure in the first pressure fluid reservoir 12a is lower than the pressure in the second pressure fluid reservoir 22a the further check valve closing member 24a lifts off from the valve seat 96a of the fourth receiving chamber 94a and opens the further outlet 40a. The further check valve closing member 24a is configured to open and to close the further outlet 40a in response to a pressure difference on opposite sides of the further check valve closing member 24a.

The variable flow check valve device 28a comprises a spool valve 16a. The spool valve 16a comprises a movable spool 18a. The spool 18a has an exemplary outer diameter of about 30 mm. The spool 18a is implemented as a sliding spool. The spool valve 16a with the spool 18a is disposed in the flow path 26a of the pressure fluid extending from the inlet 10a to the outlet 30a. The spool valve 16a forms a variable orifice within the flow path 26a of the pressure fluid. The spool valve 16a with the spool 18a is disposed in the further flow path 88a of the pressure fluid extending from the further inlet 20a to the further outlet 40a. The spool valve 16a forms a variable orifice within the further flow path 88a of the pressure fluid. The valve body 62a comprises a second receiving chamber 66a. The second receiving chamber 66a is intended to house the spool 18a. The second receiving chamber 66a is implemented as a cylindrical bore. The spool valve 16a comprises a valve stem 98a. The valve stem 98a carries the spool 18a. The valve stem 98a is implemented in one piece with the spool 18a. The valve stem 98a has a smaller radius than the spool 18a. The spool valve 16a comprises a guiding element 100a. The guiding element 100a is implemented in one piece with the spool 18a. The guiding element 100a is implemented in one piece with valve stem 98a. The guiding element 100a is configured to guide a movement of the spool 18a within the second receiving chamber 66a. The guiding element 100a comprises a pressure equalizing element 102a. The pressure equalizing element 102a is implemented as a longitudinal bore through the guiding element 100a. The pressure equalizing element 102a is intended to allow an exchange of pressure fluid between opposite sides of the pressure equalizing element 102a.

The spool valve 16a is configured to open and close the flow path 26a. The spool valve 16a is configured to open and to close the further flow path 88a. The spool 18a of the spool valve 16a is configured to adjust a flow cross section of the flow path 26a and/or the further flow path 88a at the location of the spool 18a. The spool 18a can completely block the flow path 26a and/or the further flow path 88a. In the FIG. 2 the spool valve 16a is exemplary shown in an opened state. In the opened state of the spool valve 16a, the pressure fluid can pass the spool 18a and flow either along the flow path 26a or along the further flow path 88a. When the spool valve 16a is opened and a pressure fluid flow passes through a spool opening 104a of the spool valve 16a a pressure force 38a arises. The pressure force could be a jet force, in particular if the prevailing pressures within the suspension valve 72a are high enough. The pressure force 38a is directed in a direction opposite to an opening direction of the spool valve 16a. The pressure force 38a, in particular the jet force, exerts a closing force on the spool 18a. The variable flow check valve device 28a comprises an electromagnet 52a. The electromagnet 52a is configured to actuate the spool 18a of the spool valve 16a in order to adjust a size of a flow cross section of the variable orifice/the spool opening 104a. In order to counteract the pressure force 38a, in particular the jet force, and to avoid a closing of the spool opening 104a, an increased power has to be provided by the electromagnet 52a (in case there is no balancing force 36a) present. The electromagnet 56a comprises a coil 106a. The electromagnet 52a comprises an armature 108a. The armature 108a moves along its longitudinal direction depending on the magnetic field generated by the coils 106a. In the FIG. 2, the armature 108a exemplary is shown in the maximum displaced position relative to its idle position. In this position the spool valve 16a is opened. In the idle position the spool valve 16a would be closed.

The variable flow check valve device 28a comprises a switching member 56a. The switching member 56a is implemented as a check ball. The switching member 56a forms a check valve closing member of a T-check valve. The switching member 56a is configured to either open a pressure fluid flow path 58a, 58'a from the inlet 10a to the variable orifice/the spool opening 104a or from the further inlet 20a to the variable orifice/the spool opening 104a in response to a pressure difference of the pressure fluid in the first pressure fluid reservoir 12a and the second pressure fluid reservoir 22a. The first receiving chamber 64a forms two opposite valve seats 90a, 90'a for the check valve closing member 14a. When the pressure in the first pressure fluid reservoir 12a is higher than the pressure in the second pressure fluid reservoir 22a, the check valve closing member 14a closes the valve seat 90'a towards the second pressure fluid reservoir 22a and vice versa.

The variable flow check valve device 28a comprises a force balancing unit 34a. The force balancing unit 34a of the variable flow check valve device 28a shown in FIG. 2 is implemented as a jet force balancing unit. The force balancing unit 34a is disposed in the flow path 26a, 88a of the pressure fluid. The force balancing unit 34a is configured to create the balancing force 36a to at least partially counteract the pressure force 38a acting on the spool 18a when the pressure fluid passes the at least partially opened spool valve 16a. In case of the force balancing unit 34a being implemented as a jet force balancing unit, it is configured to create the balancing force 36a to at least partially counteract the jet force acting on the spool 18a when the pressure fluid passes the at least partially opened spool valve 16a. The force balancing unit 34a comprises a balancing element 42a. The balancing element 42a of the embodiment of FIG. 2 is implemented as a balancing tube element 130a. The balancing tube element 130a is implemented as a Pitot tube or as a Venturi tube. The valve body 62a comprises a chamber 68a. In the embodiment of FIG. 2, the chamber 68a forms a third receiving chamber 132a. The balancing tube element 130a is arranged within the third receiving chamber 132a. In embodiments, which only comprise a balancing element 42a but no balancing tube element 130a, the third chamber 68a might directly form a connecting hole between the third pressure fluid reservoir 32a and the flow path 26a (see also FIG. 8). It is conceivable that the balancing tube element 130a is made from the same material (monolithically) as the valve body 62a. However preferably, the balancing tube element 130a is made from a different material than the valve body 62a. The balancing tube element 130a of FIG. 2 exemplary is implemented at least partly from a smart material. The smart material is implemented as a magnetic shape memory alloy. The smart material is configured to control and/or adjust a force compensation level (jet force compensation level) of the force balancing unit 34a (jet force balancing unit), for example by adjusting a length of the balancing tube element 130a, by adjusting an extension length the balancing tube element 130a protrudes inside the flow path 26a, 88a and/or by adjusting a flow cross section of the balancing tube element 130a. It is conceivable that for controlling the smart material an additional (not shown) electromagnet is included in the variable flow check valve device 28a or in the valve body 62a.

The balancing tube element 130a is protruding into the flow path 26a with one end 116a (see FIG. 3) of the balancing tube element 130a from a wall 44a that delimits the flow path 26a. The balancing tube element 130a is tilted in the direction of a mean flow direction 46a within the flow path 26a at a location of the balancing tube element 130a. The balancing tube element 130a is tilted with a tilting angle 110a relative to a perpendicular 112a (see FIG. 3) to the mean flow direction 46a within the flow path 26a at the location of the balancing tube element 130a. The balancing tube element 130a comprises an opening 48a that is partially facing away from the mean flow direction 46a in the flow path 26a.

The variable flow check valve device 28a comprises a third pressure fluid reservoir 32a. The force balancing unit 34a comprises the third pressure fluid reservoir 32a. The third pressure fluid reservoir 32a is separate from the first pressure fluid reservoir 12a. The third pressure fluid reservoir 32a is separate from the second pressure fluid reservoir 22a. The spool 18a of the spool valve 16a comprises a free end 50a. The free end 50a of the spool 18a of the spool valve 16a is arranged within the third pressure fluid reservoir 32a. The balancing element 42a is connecting the flow path 26a, 88a of the pressure fluid with the third pressure fluid reservoir 32a. The flow, in particular the flow velocity, of the pressure fluid passing the opening 48a of the balancing element 42a, in particular the balancing tube element 130a, causes a Bernoulli effect (or Venturi effect or Pitot effect) which leads to a reduced pressure on an opposite end 114a (see FIG. 3) of the balancing element 42a, in particular the balancing tube element 130a, which is located away from the flow path 26a, 88a. The opposite end 114a of the balancing element 42a, in particular the balancing tube element 130a, is opened to the third pressure fluid reservoir 32a. The variable flow check valve device 28a comprises a cap element 76a. The cap element 76a closes the third pressure fluid reservoir 32a. The cap element 76a separates the third pressure fluid reservoir 32a from the second pressure fluid reservoir 22a. The cap element 76a is adjustable, for example by screwing it deeper into a recess of the valve body 62a forming the third pressure fluid reservoir 32a.

The variable flow check valve device 28a comprises a reset spring 54a. The reset spring 54a is with one end supported at the free end 50a of the spool 18a of the spool valve 16a. The reset spring 54a is with the other end supported at the cap element 76a. The reset spring 54a is configured to reset the spool 18a into the idle position/the closed position of the spool valve 16a (shown in FIG. 3). The opened position of the spool valve 16a represents a soft state of the suspension valve 72a. The closed position of the spool valve 16a represents a hard state of the suspension valve 72a. The reset spring 54a is arranged inside the third pressure fluid reservoir 32a. The reset spring 54a has a cylindrical shape. However, the reset spring 54a may also be implemented with a conical shape.

Figure 3:
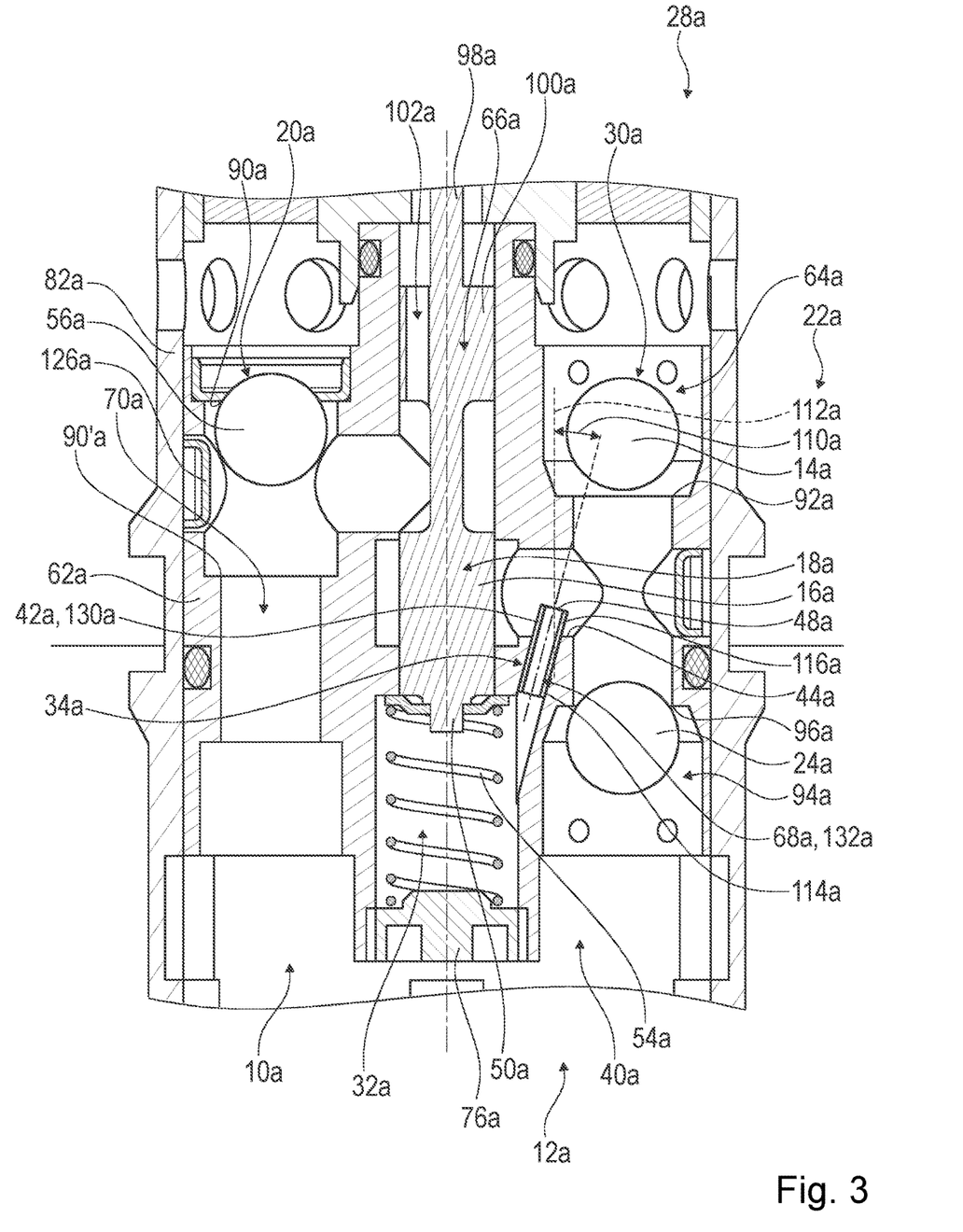

FIG. 3 shows a schematic enlarged part of the cross section of the variable flow check valve device 28a with the spool valve 16a being in the closed state.

Figure 4:
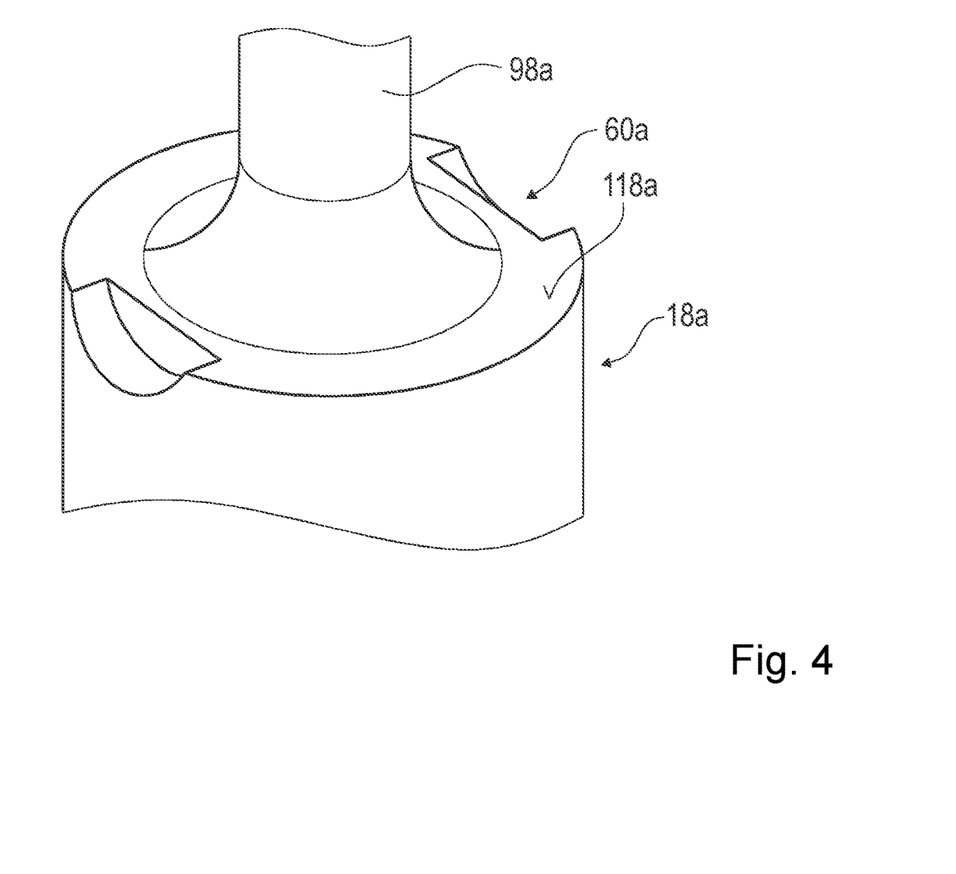

FIG. 4 shows a schematic perspective view of an exemplary embodiment of the spool 18a of the spool valve 16a. The variable flow check valve device 28a comprises a bleed orifice 60a. The bleed orifice 60a according to the exemplary embodiment of FIG. 4 is integrated in the spool 18a. The bleed orifice 60a is implemented as a notch in a closing surface 118a of the spool 18a. Additionally or alternatively similarly integrated bleed orifices could be located in the switching member 56a and/or the further check valve closing member 24a.

Figure 5:
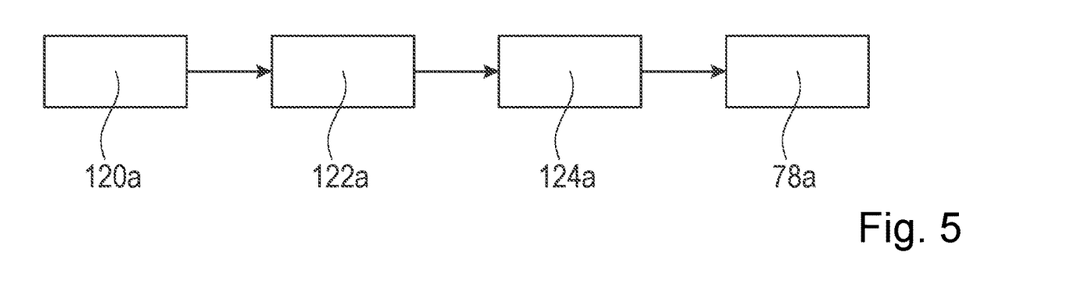

FIG. 5 shows a schematic flowchart of a method for operating the variable flow check valve device 28a. In at least one method step 120a, a force is attacking at the first pressure fluid reservoir 12a (compression stage) or at the second pressure fluid reservoir 22a (rebound stage). In at least one further method step 122a, the check valve closing members 14a, 24a and the switching member 56a are automatically positioned by the pressure difference between the first pressure fluid reservoir 12a and the second pressure fluid reservoir 22a. In at least one further method step 124a, the spool 18a is opened in a controlled manner using the electromagnet 52a. By opening the spool 18a, the flow through the respective flow path 26a, 88a is initiated. Due to this, the pressure force 38a, in particular the jet force arises. In at least one further method step 78a the pressure force 38a that arises when the pressure fluid passes the opened spool valve 16a and that acts on the spool 18a is counteracted at least partially by the balancing force 36a. The balancing force 36a thereby is created by the force balancing unit 34a that is disposed in the flow path 26a, 88a of the pressure fluid.

FIGS. 6 to 9 show a further embodiment of the invention. The following descriptions and the drawings are essentially limited to the differences between the embodiment examples, although reference can in principle also be made to the drawings and/or the description of the other embodiment examples, in particular of FIGS. 1 to 5, with respect to components with the same designation, in particular with respect to components with the same reference signs. To distinguish the embodiment examples, the letter a is placed after the reference signs of the embodiment example in FIGS. 1 to 5. In the embodiment examples of FIGS. 6 to 9, the letter a is replaced by the letters b to d.

Figure 6:
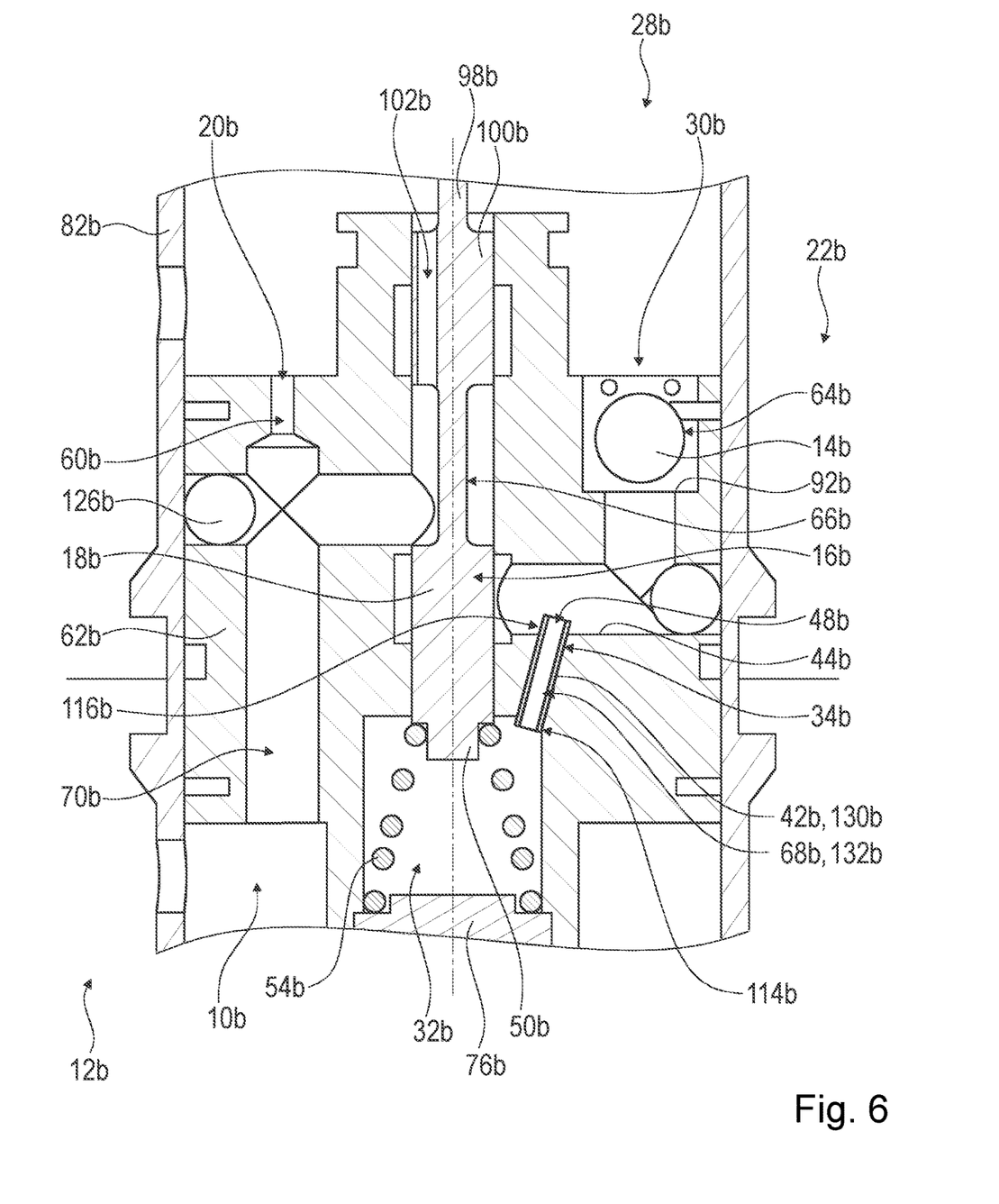
Figure 7:
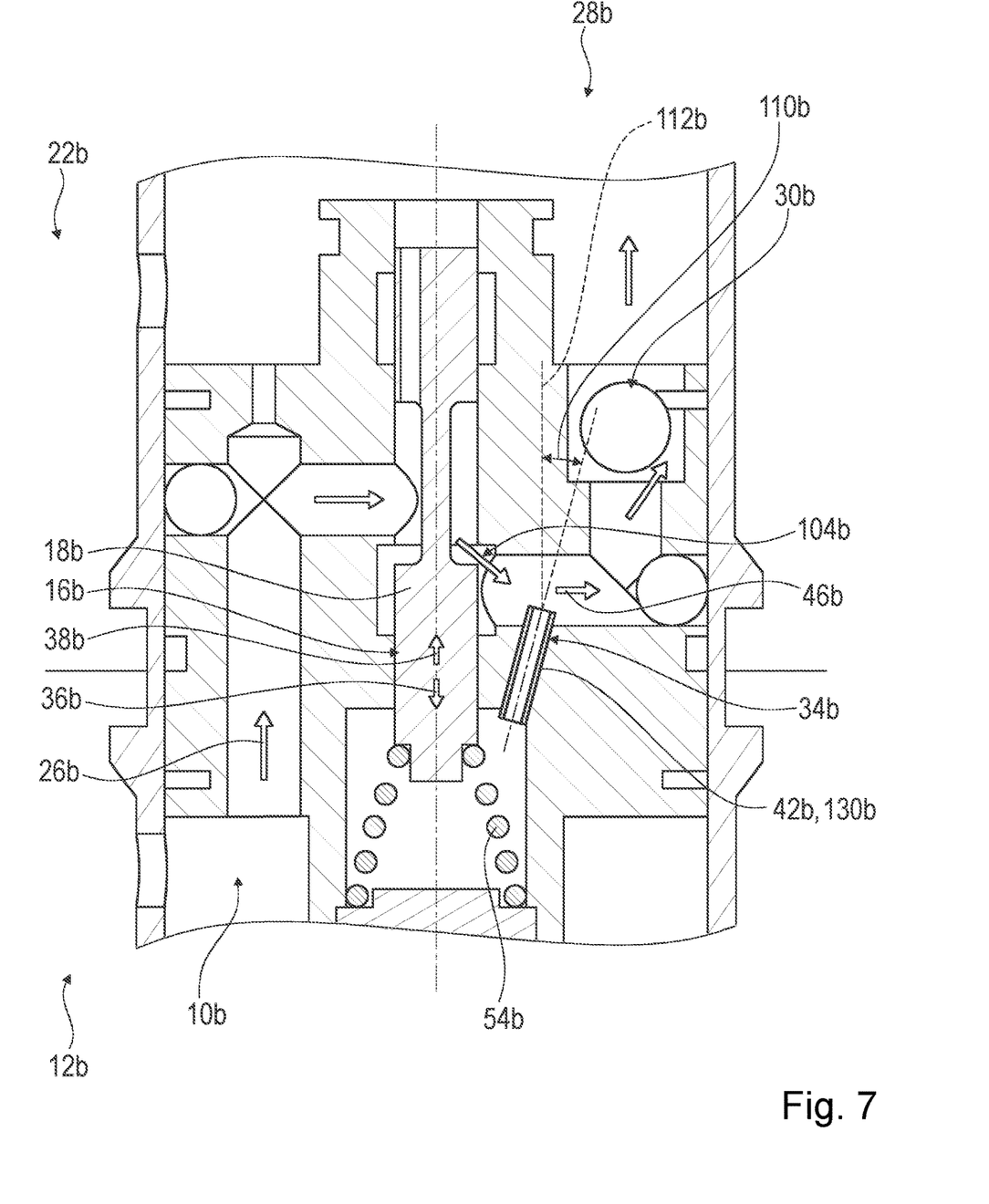

FIGS. 6 and 7 show a schematical cross sectional view of an alternative monodirectional type of suspension valve 72b. The alternative suspension valve 72b comprises an alternative variable flow check valve device 28b. In FIG. 6 the alternative variable flow check valve device 28b is shown with a spool valve 16b in a closed state and in FIG. 7 the alternative variable flow check valve device 28b is shown with the spool valve 16b in the open state. The alternative variable flow check valve device 28b comprises only one check valve closing member 14b. The alternative variable flow check valve device 28b comprises no switching member. The alternative variable flow check valve device 28b comprises only one unidirectional flow path 26b. The alternative variable flow check valve device 28b comprises an inlet 10b, an outlet 30b and a further inlet 20b. The inlet 10b is opened towards a first pressure fluid reservoir 12b (compression stage). The further inlet 20b is opened towards a second pressure fluid reservoir 22b (rebound stage). The further inlet 20b is implemented as a bleed orifice 60b. The further inlet 20b has a much smaller flow cross section as the inlet 10b.

Figure 8:
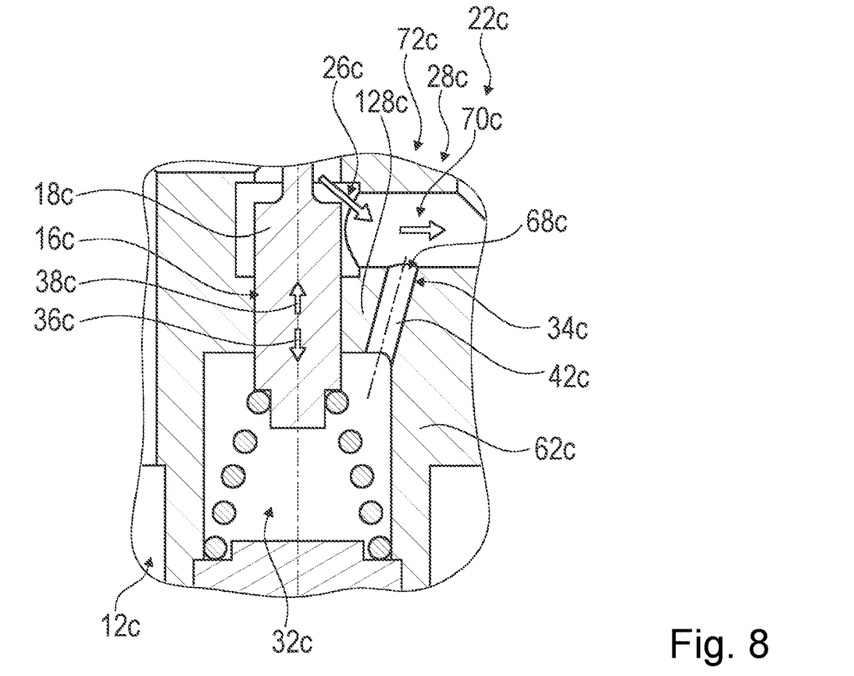

FIG. 8 shows a part of a schematical cross sectional view of a second alternative suspension valve 72c. The second alternative suspension valve 72c could be either of the monodirectional type or of the bidirectional type. The second alternative suspension valve 72c comprises a second alternative variable flow check valve device 28c. The second alternative variable flow check valve device 28c comprises a spool valve 16c. The spool valve 16c comprises a movable spool 18c. The second alternative variable flow check valve device 28c comprises a force balancing unit 34c. The force balancing unit 34c is disposed in a flow path 26c of a pressure fluid of the second alternative suspension valve 72c. The force balancing unit 34c is configured to create a balancing force 36c to at least partially counteract a pressure force 38c acting on the spool 18c when the pressure fluid passes the at least partially opened spool valve 16c.

The second alternative suspension valve 72c comprises a first pressure fluid reservoir 12c, a second pressure fluid reservoir 22c and a third pressure fluid reservoir 32c. The force balancing unit 34c comprises the third pressure fluid reservoir 32c. The third pressure fluid reservoir 32c is separate from the first pressure fluid reservoir 12c and from the second pressure fluid reservoir 22c. The second alternative variable flow check valve device 28c comprises a valve body 62c. The flow path 26c is formed by channels 70c, which are integrated into the valve body 62c. The third pressure fluid reservoir 32c is formed by the valve body 62c. The valve body 62c comprises a wall 128c that separates the third pressure fluid reservoir 32c from the flow path 26c of the pressure fluid. The force balancing unit 34c comprises a balancing element 42c. The balancing element 42c is implemented as a connecting hole within the wall 128c that separates the third pressure fluid reservoir 32c from the flow path 26c of the pressure fluid. The second alternative variable flow check valve device 28c, in particular the second alternative suspension valve 72c, is free from any balancing tube element.

Figure 9:
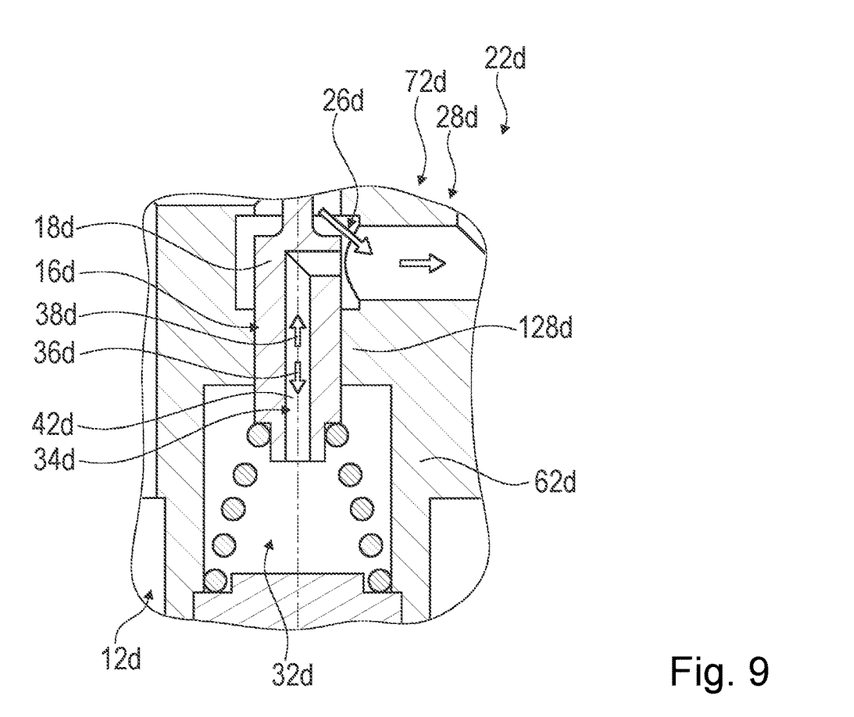

FIG. 9 shows a part of a schematical cross section view of a third alternative suspension valve 72d. The third alternative suspension valve 72d could be either of the monodirectional type or of the bidirectional type. The third alternative suspension valve 72d comprises a third alternative variable flow check valve device 28d. The third alternative variable flow check valve device 28d comprises a spool valve 16d. The spool valve 16d comprises a movable spool 18d. The third alternative variable flow check valve device 28d comprises a force balancing unit 34d. The force balancing unit 34d is disposed in a flow path 26d of a pressure fluid of the third alternative suspension valve 72d. The force balancing unit 34d is configured to create a balancing force 36d to at least partially counteract a pressure force 38d acting on the spool 18d when the pressure fluid passes the at least partially opened spool valve 16d.

The third alternative suspension valve 72d comprises a first pressure fluid reservoir 12d, a second pressure fluid reservoir 22d and a third pressure fluid reservoir 32d. The force balancing unit 34d comprises the third pressure fluid reservoir 32d. The third pressure fluid reservoir 32d is separate from the first pressure fluid reservoir 12d and from the second pressure fluid reservoir 22d. The force balancing unit 34d comprises a balancing element 42d. The balancing element 42d is implemented as a connecting hole within the spool 18d. The third alternative variable flow check valve device 28d, in particular the third alternative suspension valve 72d, is free from any balancing tube element and from any connecting hole connecting the third pressure fluid reservoir 32d and the flow path 26d by penetrating a wall 128d of a valve body 62d of the second alternative variable flow check valve device 28d that as well forms the third pressure reservoir 32d at least partially.

The invention claimed is:

1. A variable flow check valve device comprising
an inlet connected with a first pressure fluid reservoir,
an outlet connected with a second pressure fluid reservoir, which is separate and/or separable from the first pressure fluid reservoir,
a check valve closing member configured to open and to close the outlet in response to a pressure difference of the pressure fluid on opposite sides of the check valve closing member, and
a spool valve with a movable spool disposed in a flow path of the pressure fluid extending from the inlet to the outlet, the spool valve forming a variable orifice within the flow path of the pressure fluid,
wherein the variable flow check valve device further comprises a force balancing unit disposed in the flow path of the pressure fluid and configured to create a balancing force to at least partially counteract a pressure force acting on the spool when the pressure fluid passes an at least partially opened spool valve, and
wherein the force balancing unit comprises a balancing tube element that is at least partially protruding into the flow path from a wall delimiting the flow path.

2. The variable flow check valve device according to claim 1, wherein the balancing tube element is a Pitot tube or as a Venturi tube.

3. The variable flow check valve device according to claim 2, wherein the balancing tube element is implemented at least partly from a magnetic shape alloy, which is configured to control and/or adjust a pressure force compensation level of the force balancing unit.

4. The variable flow check valve device according to claim 1, wherein the balancing tube element is tilted in the direction of a mean flow direction of the pressure fluid within the flow path at a location of the balancing tube element.

5. The variable flow check valve device according to claim 1, wherein the balancing tube element comprises an opening that is at least partially facing away from a mean flow of the pressure fluid in the flow path.

6. The variable flow check valve device according to claim 1, wherein the force balancing unit comprises a third pressure fluid reservoir that is separate and/or separable from the first pressure fluid reservoir and from the second pressure fluid reservoir and wherein the force balancing unit comprises a balancing element that is connecting the flow path of the pressure fluid with the third pressure fluid reservoir.

7. The variable flow check valve device according to claim 6, wherein the balancing element is implemented as a connecting hole within a wall that separates the third pressure fluid reservoir from the flow path of the pressure fluid or as a connecting hole within the spool or as a balancing tube element.

8. The variable flow check valve device according to claim 6, wherein a free end of the spool of the spool valve is arranged within the third pressure fluid reservoir.

9. The variable flow check valve device according to claim 6, comprising a reset spring, wherein the reset spring is at least to a great extent arranged inside the third pressure fluid reservoir.

10. The variable flow check valve device according to claim 1, comprising an electromagnet, which is configured to actuate the spool of the spool valve in order to adjust a size of a flow cross section of the variable orifice.

11. The variable flow check valve device according to claim 1, comprising a reset spring, which is supported at the free end of the spool of the spool valve.

12. The variable flow check valve device according to claim 1, comprising a further inlet, which is connected with the second pressure fluid reservoir.

13. The variable flow check valve device according to claim 12, wherein the further inlet is implemented as a bleed orifice.

14. The variable flow check valve device according to claim 12, wherein the further inlet has an at least substantially identical opening cross section as the inlet.

15. The variable flow check valve device according to claim 12, comprising a switching member, which is configured to either open a pressure fluid flow path from the inlet to the variable orifice or from the further inlet to the variable orifice in response to a pressure difference of the pressure fluid in the first pressure fluid reservoir and the second pressure fluid reservoir.

16. The variable flow check valve device according to claim 12, comprising a further outlet, which is connected with the first pressure fluid reservoir and which comprises a further check valve closing member, configured to open and to close the further outlet in response to a pressure difference of the pressure fluid on opposite sides of the further check valve closing member.

17. The variable flow check valve device according to claim 1, comprising one or more bleed orifices, which are integrated in the spool, or in a switching member, which is configured to either open a pressure fluid flow path from the inlet to the variable orifice or from a further inlet, which is connected with the second pressure fluid reservoir, to the variable orifice in response to a pressure difference of the pressure fluid in the first pressure fluid reservoir and the second pressure fluid reservoir, or in a further check valve closing member located at a further outlet which is connected with the first pressure fluid reservoir and configured to open and to close the further outlet in response to a pressure difference of the pressure fluid on opposite sides of the further check valve closing member.

18. The variable flow check valve device according to claim 1, comprising a single-piece or monolithic valve body which at least comprises the inlet, the outlet, a first receiving chamber for the check valve closing member, a second receiving chamber for the spool, a third chamber forming a balancing element of the force balancing unit or receiving the balancing tube element to balance a jet force acting on the spool and channels forming the flow path.

19. A monodirectional or bidirectional suspension valve with the variable flow check valve device according to claim 1.

20. An adjustable vehicle suspension system with the monodirectional or bidirectional suspension valve according to claim 19.

* * * * *